March 20, 1945.  M. P. McCARTY  2,372,166
FLOWMETER
Filed June 20, 1942
Fig. 1.
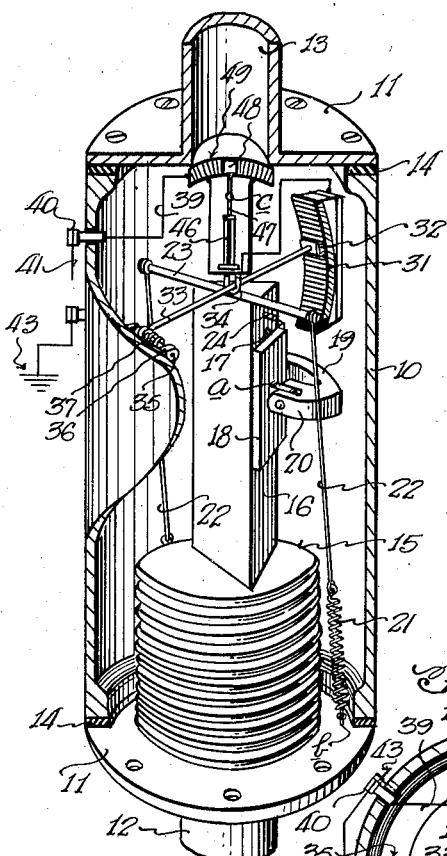
Fig. 2.
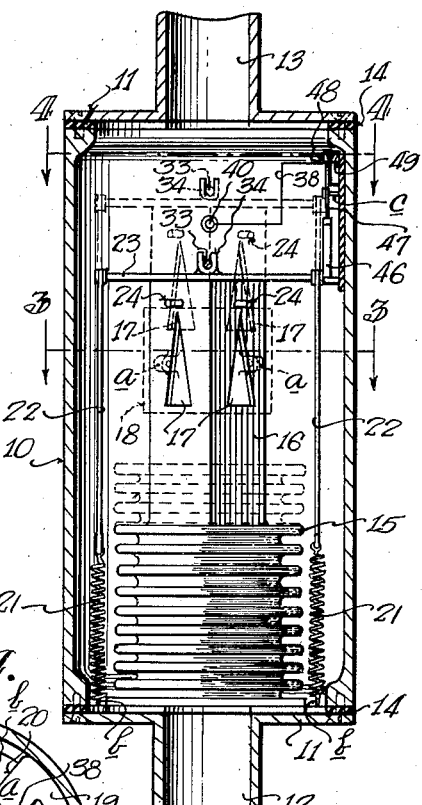
Fig. 4.
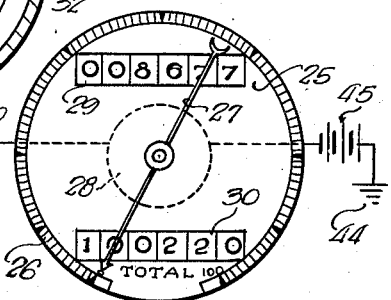
Fig. 3.
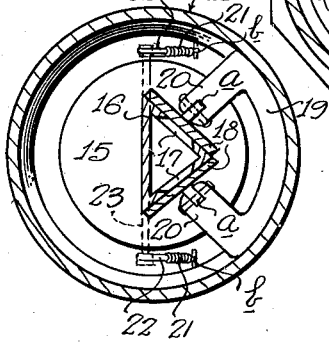
Fig. 5.
MADISON P. McCARTY
INVENTOR.
BY
ATTORNEY Patented Mar. 20, 1945

2,372,166

UNITED STATES PATENT OFFICE 2,372,166

FLOWMETER

Madison P. McCarty, Chicago, Ill.

Application June 20, 1942, Serial No. 447,765

7 Claims. (Cl. 73—208)

This invention relates to fluid metering devices and it has particular reference to a device for measuring the quantity of fluid flowing from one point to another.

The principal object of the invention is to provide means especially adapted for incorporation in the fuel lines of vehicles and airplanes for accurately measuring the quantity of fuel forced by the pump to the carburetor, under any and all conditions, temperature included, and at all speeds of the engine.

Another object of the invention is to provide a fluid flow meter in whose construction there is minimum frictional wear between the parts and in which there is provided a self-adjusting valve designed to obviate any likelihood that it will be rendered inoperative to reduce the accuracy of the device by the presence of any foreign matter entrained in the fuel.

Another and highly important object of the invention is to provide, in combination with motor actuated, visible indicating means, a device having a resistance element therein having connection with the said motor whereby the speed of the latter will be varied in direct relation to the rate of flow of fluid passing through the metering device, by reason of variations in the degree of resistance. Moreover, and equally important is the provision of auxiliary resistance compensation means rendered effective by variations in temperature and consequently viscosity of the fluid passing through the device, such latter resistance being thermostatically controlled to decrease the speed of the motor as the viscosity of the fuel is increased and vice-versa to insure accurate reading of the indicator irrespective of temperature conditions which is a desideratum especially in the application of the invention to airplanes.

With the foregoing objects as paramount, the invention has particular reference to certain salient features of construction and arrangement of parts, to become manifest as the description proceeds, taken in connection with the accompanying drawing, wherein:

Figure 1 is a perspective, partly broken away view of a device constructed according to the present invention.

Figure 2 is a side elevational view in vertical section, taken at a quarter angle on Figure 1.

Figure 3 is a transverse section on line 3—3 on Figure 2.

Figure 4 is a transverse section, taken on line 4—4 on Figure 2, illustrating also an indicator circuit, and Figure 5 is an elevational view of a form of indicator employed in connection with the flow meter of the invention.

Continuing with a more detailed description of the drawing, reference is primarily made to Figure 1 wherein 10 denotes a shell having its ends closed by plates 11 but allowing passage of fluid through the shell by means of the inlet pipe 12 and outlet pipe 13 which provide connection in the fuel or fluid line, not shown. Sealing gaskets 14 are interposed between the plates and the ends of the shell to insure against leakage of fluid, especially gasoline, therefrom.

Centrally disposed on one plate 11 and initially receiving the fluid as it enters the shell 10, is a Sylphon tube or metallic bellows 15. Attached to this tube is a riser 16 of preferably triangular cross-section, as shown, having a closed upper end. It is apparent that the arrangement provides for upward movement of the riser 16 upon expansion of the bellows 15, the degree of which is dependent upon the rate of flow of fluid entering the same.

The riser 16 is provided with fluid outlet ports 17 which are preferably of triangular shape with the apex at the top to produce a pinching action on the fluid as the same emerges therefrom. To control the egress of fluid from these ports is a pair of plates 18 having ears a thereon. The plates are angularly related and as a means for mounting them in proper relation to their respective faces of the triangular riser, a bracket 19 is provided, having arms 20, bifurcated to receive the ears a which are pivoted, as shown. This pivotal arrangement allows a limited degree of movement of the plates 18 to insure self-adjustment thereof on the riser inasmuch as a certain degree of flexibility is required of the latter for satisfactory performance.

The edges of the outlet ports 17 are beveled to a sharpe edge, as shown. This is to insure against any tendency of bits of foreign matter, likely to become entrained with the fluid, to accumulate or lodge at the point of egress and hold the riser away from its seat against the plates 18, which latter, for purposes of immediate identification, will be hereinafter referred to as valve plates.

The means by which the riser is held in operative relation to the valve plates 18 is in the form of springs 21. These springs have their lower ends affixed at b to a plate 11 and at a point forwardly of the riser 16, that is to say, in front of a vertical line through the axis of the riser, with rods 22 extending angularly upward and connected to a cross-member 23 affixed to the top of the riser 16. It is apparent that the springs 21, in being offset relative to the longitudinal axis of the riser, will exert a pull thereon towards the valve plates 18 and in so doing, will maintain close relationship at all times between the riser and plates, except in the event a foreign particle should, for any reason, become lodged between the plates 18 and the surfaces of the riser 16 which they contact. On such an occasion, the pressure imposed on the fluid by the fuel pump (not shown) would be such as to urge the riser away from the valve plates with a momentary movement against the dual resistance of the springs 21 and the inherent characteristic of the bellows 15 to remain upright, such movement, combined with the built up pressure of fluid being instrumental to effect dislodgement of the impediment.

To insure against full collapse of the bellows 15, pins 24 are affixed to the effective faces of the riser, to extend outward immediately above the ports 17. During periods when no fluid is passing through the device and the ports closed, these pins rest upon the upper ends of the valve plates 18 to limit contraction of the bellows.

It is apparent from the foregoing that as fluid enters the bellows 15 in increasing volume, which may be effected by increased accelerator or throttle action, the bellows expands in proportion to increase the open area of the ports 17. Thus, fluid in increased volume is allowed to emerge through these ports to fill the shell 10 and which will eventually pass out through the pipe 13 to the carburetor or to some other predetermined point.

In order to electrically compute the flow of fluids in measured quantities, an indicator such as shown in Figure 5 is provided, having a dial 25, suitably calibrated at 26 and over which a pointer 27 operates. The pointer 27 is operated by a small electric motor 28 whose speed is variable, in the manner to become apparent presently. During operating periods of the engine, the pointer indicates on the calibrations 26 of the dial the consumption of fuel in gallons, that is, the quantity of fuel being forced by the fuel pump to the carburetor of the engine. Moreover, the indicator is so designed as to register by means of counter 29 for subsequent record the quantity of fuel consumed on a trip while the counter 30 registers the total consumption.

Referring now to the electrical means by which the indicator is controlled by the described device, it will be observed in Figure 1 particularly that a resistance element 31 is mounted on the wall of the shell 10. This resistance element is of arcuate form for the reason to become apparent presently. Operating over the resistance element is a contact brush 32, carried by an arm 33 which rocks in a saddle 34 affixed to the top of the riser 16 and which is disposed at right angles to the longitudinal axis of the riser. The opposite end of the arm 33 is pivotally mounted on a pin 35, journaled in a suitable bracket bearing 36 which, by means of a torsion spring 37, holds the arm against other than arcuate movement as the riser ascends and descends due to variations in rate of flow of fluid passing therethrough. As this occurs, the contact brush 32 moves over the resistance element 31 to bring about a change in the resistance to the motor 28. This is effected through wire 38, connecting the resistor 31 to the thermostatic control, to be described presently, and through wire 39 to the binding post 40, and through wire 41 to the voltage regulator (Figure 4) and to the motor 28 through wire 42. It is to be noted that the shell 10 is grounded at 43 while a ground 44 is provided for the motor 28 through current source 45 (Figure 5).

Under optimum conditions, the speed of the motor 28 is in direct relation to the rate of flow of fluid flowing through the shell 10 and is kept so by the resistor 31. In other words, as the quantity of fluid through the device increases, the resistance in element 31 is decreased to increase the speed of motor 28, which latter propels the pointer 27 to a higher degree on the calibrated scale 26. Thus the operator or pilot, as the case may be, is at all times apprised of the quantity of fuel his engine is consuming which may include a time or distance factor for precise calculations.

In some cases, especially in airplane usage where altitude changes the temperature and consequently the viscosity of the fuel, an automatic resistance compensating means is provided. This means consists of a bimetallic or other suitable type of heat sensitive element 46, which is mounted interiorly of the shell 10 for constant immersion in the liquid flowing through the device. This element, due to its being highly sensitive to temperature, responds to even the slightest variation in the temperature of the liquid. Accordingly, it bends into an arc and in so doing, an arm 47 connected thereto and pivoted intermediate its ends at c is actuated on its pivot, causing the contact brush 48 to move over the resistor 49, through which current passes from the source through the resistor 31, earlier described. Thus is provided an inverse compensation ratio under varying temperature conditions.

As the temperature of the liquid falls, the friction thereof increases; therefore, the movable element in the device, i. e., the bellows and riser, will be moved a greater distance in cold temperatures than in hot or warm temperatures, the amount of fluid flow being the same. A thick liquid would cause the movable element of the device to be expanded farther than a thin liquid, due to the difference in viscosity thereof, each having the same amount of flow, i. e., each passing the same amount of liquid. Accordingly, if the thick liquid causes the movable element to travel a greater distance than the same flow of a thin liquid, an erroneous indication of the electrical indicator would exist. The thermostatic compensating means of the invention obviates the foregoing deficiency, for, if the movable element is expanded to a greater degree by the increased friction of the liquid, as stated, the speed of the indicator motor would be higher than it should be if the instrument was calibrated at a higher or fixed temperature. Thus, the indicator would show a higher volume of flow than was actually being consumed. Therefore, provision is made so that by increasing the resistance through the thermal compensating means, the speed of the motor 28 is decreased to insure an indicator reading at a lower point on the calibrated scale 26 to show an accurate indication of actual flow. Conversely, increased temperatures to reduce fluid friction will operate to lower the resistance in element 49 and will therefore increase the speed of the motor 28 to correspond to variations in fluid flow as described.

The invention has been described with great particularity as to form and function of the various elements of the combination, but it is understood that various changes and modifications are possible without departing from the spirit and intent of the invention and as fall within the scope and meaning of the appended claims.

What is claimed is:

1. A device for measuring the flow of fluid including, in combination with a motor driven indicator, a closed chamber through which the fluid is constrained to axially pass, pressure expansive means within said chamber into and through which said fluid initially passes said expansive means having means producing a differential pressure varying with the flow, and said expansive means having movements responding to said differential pressure varying with the rate of flow of said fluid passing therethrough, a motor circuit, a variable resistor in said circuit, means actuated by said pressure expansive means and movable over said resistor to vary the resistance in said motor circuit, to accordingly vary the speed of the motor of said indicator in direct relation to variations in the rate of flow of the fluid flowing through said chamber to effect a change in said indicator whereby to visibly disclose thereon the volume of fluid flow and means responsive to fluctuations in the temperature and consequent viscosity of said fluid to accordingly and additionally vary the resistance in said motor circuit.

2. A device of the character set forth in claim 1 in which the pressure expansive means consists of a metallic bellows embracing the inlet port of the chamber and having a riser provided with fluid outlets, across which the bellows responds to differential pressures, means against which said riser is constrained to operatively slide as a closing means for said outlets and means for yieldingly retaining said riser in operative position on said latter means.

3. A device of the character set forth in claim 1 in which the pressure expansive means is comprised of a pressure expansible and contractible body communicating with the inlet port of the chamber and an extension therefrom triangular in cross-section having fluid outlet ports across which said body responds to differential pressures, means conforming to said extension and against which the latter slides to normally close said ports, and means yieldingly maintaining operative relationship between said extension and said port closing means.

4. In a device for measuring the flow of fluid in its course through a supply line, a closed chamber in said line through which said fluid is constrained to pass, an expansible bellows initially receiving the fluid entering said chamber, a riser carried by said bellows having normally closed fluid outlet ports and adapted to be reciprocated by expansive and contractive movements of said bellows in direct relation to variations in fluid flow, and to accordingly vary the opening and closing of said ports, an indicator, a motor therefor and a motor circuit, resistance means affected by movements of said riser to vary the resistance in said circuit to accordingly vary the speed of said motor whereby to cause the reading of said indicator to correspond to variations in the volume of fluid flowing in said line, and means responsive to temperature changes in said fluid to compensate for irregularities on said indicator resulting from variations in fluid viscosity.

5. In a device for measuring the volume of fluid flowing through a supply line, a chamber in said line through which the fluid is constrained to flow, an indicator, a motor therefor and a motor circuit, a bellows in said chamber whose expansive and contractive movements are caused by and in direct relation to variations in differential pressure of said fluid, across valve means, valve means whose opening and closing actions are effected by said bellows, variable resistance means in said circuit, means operated also by movements of said bellows and operatively related to said variable resistance means to change the resistance in said motor circuit in direct relation to changes in said differential fluid pressure to accordingly vary the speed of said motor, whereby to effect an indicator reading corresponding to volume of flow and temperature controlled means likewise effecting a change in the speed of said motor to compensate for deviations in indicator readings resulting from variations in fluid temperatures.

6. A flowmeter of the character set forth in claim 5 in which the temperature controlled means is comprised of a bimetallic element submerged in and sensitive to changes in temperature of the fluid, combined with and operating a variable resistance means to change the speed of the indicator motor in corresponding relation to changes in fluid viscosity.

7. A flowmeter of the kind described in claim 5 in which the resistance means and the temperature controlled means are separate elements but contained in the same motor circuit whereby normal fluid temperature will be ineffective to operate said temperature controlled means during normal operation of said flowmeter but will become effective to additionally vary the resistance in the motor circuit as changes in fluid temperature occur to accordingly vary the speed of the motor.

MADISON P. McCARTY.